Feb. 9, 1926.  
F. S. ENGEL  
1,572,193  
MEANS FOR TESTING MUSCULAR DEVELOPMENT  
Filed August 9, 1924
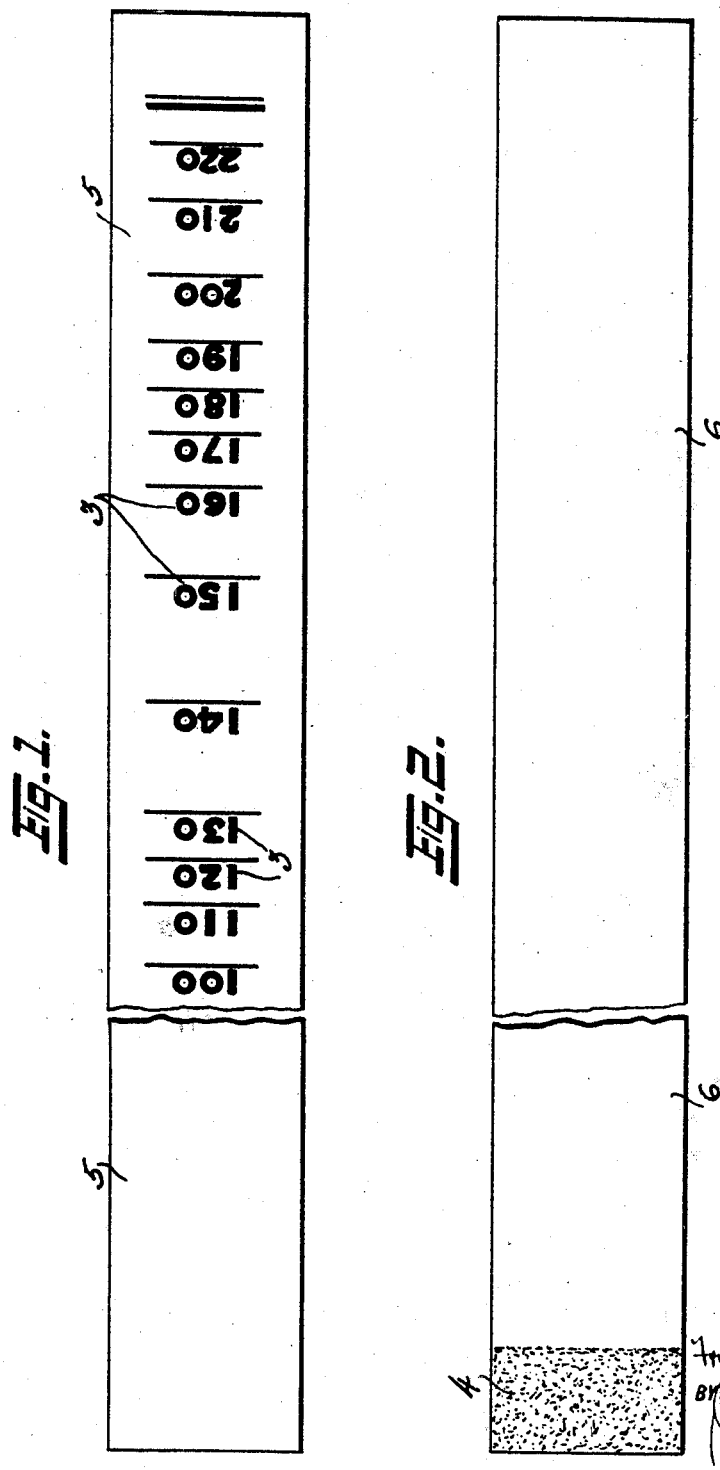

Patented Feb. 9, 1926.

1,572,193

UNITED STATES PATENT OFFICE.

FREDERICK S. ENGEL, OF NEW YORK, N. Y.

MEANS FOR TESTING MUSCULAR DEVELOPMENT.

Application filed August 9, 1924. Serial No. 731,093.

*To all whom it may concern:*

Be it known that I, FREDERICK S. ENGEL, a citizen of the United States, and a resident of the borough of Manhattan, city, county, and State of New York, have invented certain Means for Testing Muscular Development, of which the following is a specification, reference being had to the accompanying drawings, which form a part of the same.

An object of my invention is to provide means adapted to encircle expansible parts of a body, as for instance the arm or chest, the device being set at a pre-determined breakage point which is ascertained by certain characteristics of the person, the size of whose muscles are to be tested, such as for instance his weight.

Other objects of the invention will be readily suggested upon reading this specification taken in connection with the accompanying drawings in which, Fig. 1 shows one side of a breakable strip made of paper or other suitable material, having certain calibrations printed thereon, and Fig. 2 shows the reverse side of such strip a portion of the surface near one of the ends thereof being provided with an adhesive.

Referring now in detail to the drawings, 5 represents a strip of breakable material, paper for instance, on one face 5 of which is printed a scale having calibrations 3 extending from one end toward the center and in this instance adapted to correspond to the weights of individuals. It will be understood that the present drawings are not made to scale but that the calibrations 3 in practise are located thereon according to the best experience tables, and increasing in value toward the end of the strip.

On the reverse side of this strip at the end opposite to the calibration 3 is an adhesive 4.

Assuming that the present muscular development strip is adapted for use in testing the muscle of the biceps, the same is wrapped in overlapping relation around the biceps of an arm of a person, which are about to be tested, and the adhesive caused to secure one end of the strip to the face thereof in association with the number of pounds of weight of such person indicated by the calibrations. For instance, if the person whose muscular development is being measured is one hundred and fifty pounds, the strip will be encircled about the biceps of his arm to be tested while the said biceps are in distended muscular condition, and the adhesive end of the strip is positioned and secured on the line under the numeral 150. The biceps being tested are then expanded, and if such expansion thereof breaks the strip, the biceps which are being tested are of the proper muscular development. If the expansion of the biceps does not bring about a break of the strip, then it indicates that they are under-developed and the looped strip may be preserved, a course of exercises in muscular development indulged in, and the strip slipped over the arm in position on the relaxed biceps from time to time until an extension of the biceps causes the strip to break.

I have described what I believe to be the best embodiment of my invention. I do not wish to be confined, however, in patent protection to the embodiment disclosed.

What I desire to cover by Letters Patent is set forth in the appended claims.

1. Means for testing muscular development comprising a breakable strip having calibrations in units of weight of a person on one side and progressing from an intermediate portion toward one end thereof, and an adhesive on the reverse side and adjacent the opposite end and adapted to secure said end to the strip in register with one of said calibrations, said strip thereby adapted to closely encircle an expansible muscular part of a body before the same is expanded.

2. Means for testing muscular development comprising a breakable strip having calibrations on its one side and progressing from an intermediate portion toward one end thereof, means for securing the other end of said strip in register with one of said calibrations so as to form a band adapted to encircle an expansible muscular part of a body before the same is expanded.

FREDERICK S. ENGEL.